United States Patent [19]

Cummings

[11] 4,210,425

[45] Jul. 1, 1980

[54] GLYCOL POLYETHER-ACRYLIC ACID-AMINE REACTION PRODUCT FOR FUEL AND MINERAL OILS

[75] Inventor: Cummings, William M., Fishkill, N.Y.

[73] Assignee: Texaco Inc., White Plains, N.Y.

[21] Appl. No.: 836,890

[22] Filed: Sep. 26, 1977

[51] Int. Cl.$^2$ ............................ C10L 1/18; C10L 1/22
[52] U.S. Cl. ............................................ 44/72; 44/77
[58] Field of Search ...................... 560/155; 44/71.72; 252/51.5

[56] References Cited

U.S. PATENT DOCUMENTS 3,963,771  6/1976  Robson et al. .................. 560/155

*Primary Examiner*—Winston A. Douglas
*Assistant Examiner*—J. V. Howard
*Attorney, Agent, or Firm*—Carl G. Ries; Robert A. Kulason; James J. L'Oughlin

[57] ABSTRACT

A glycol polyether-acrylic acid-amine reaction product having detergent and corrosion inhibiting properties for fuels and lubricating oil compositions is provided.

6 Claims, No Drawings

GLYCOL POLYETHER-ACRYLIC ACID-AMINE REACTION PRODUCT FOR FUEL AND MINERAL OILS

BACKGROUND OF THE INVENTION

1. Field of the Invention

Internal combustion gasoline engine design is undergoing important changes to meet stricter emission standards set for engine and exhaust gas emissions. A significant change in engine design is the feeding of blow-by gases from the crankcase zone of the engine into the intake air-fuel mixture near the throttle plate of the carburetor rather than venting these gases to the atmosphere as was practiced formally. This blow-by gas contains substantial amounts of deposit-forming substances and it is known to form deposits in and around the throttle plate area of the carburetor. Another significant change in engine design and operation is the recirculation of a part of the exhaust gases to the fuel air intake of the engine. These exhaust gases also have a pronounced deposit-forming tendency. The carburetor deposits produced by the blow-by gases and the recycled exhaust gases restrict the flow of air through the carburetor at idle and at low speeds so that an over-rich fuel mixture results. This condition produces rough engine idling and/or stalling and leads to the release of excessive hydrocarbon emissions to the atmosphere.

Another problem associated with internal combustion engine operation relates to the crankcase lubricant and its use. Crankcase lubricating oils are inevitably contaminated with foreign substances such as dirt, water and decomposition products from the combustion process or from the breakdown of the lubricating oil itself. Significant amounts of sludge can be produced in the crankcase of an engine as a result of the presence of foreign matter and this sludge tends to adhere to the walls and passages in the engine. A particularly serious problem arises when the sludge in the crankcase lubricant deposits in the small passageways of the engine, thereby restricting the flow of the lubricating oil to bearings and valves in the engine. In the more serious instances, the oil flow through the oil passageways tends to be completely restricted resulting in a failure of the system to lubricate critical engine bearing surfaces. This condition leads to excessive cam shaft wear and ultimately to reduced engine life. An effective detergent in the crankcase lubricating oil serves to keep the foreign substances dispersed in the oil and also improves the effectiveness of the oil filter to remove a substantial amount of the foreign matter from the oil.

Another problem which always occurs where fuel and oil compositions are employed is the problem of corrosion. Engines and metal components in contact with a mineral oil and, more particularly, when they are employed in an environment that permits contact of the oil composition with water or water vapor tend to exhibit damage from corrosion. Additives which can impart effective corrosion-inhibiting properties to and oil composition while at the same imparting other useful characteristics such as detergent properties are particularly attractive additives for fuels and lubricants.

2. The Prior Art

U.S. Pat. No. 2,948,757 discloses a class of glycerol polyethers described as trihydroxypolyalkylene ethers of glycerol having anti-foam properties.

SUMMARY OF THE INVENTION

An oil-soluble ashless detergent and corrosion inhibitor is provided which is the reaction product of a glycol polyether or polypropylene glycol represented by the formula:

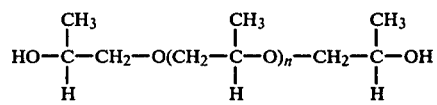

in which n represents a number from about 10 to 90 with an acrylic acid, represented by the formula:

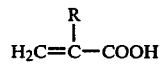

in which R is hydrogen or a methyl radical, and an amine, represented by the formula:

in which R is a monovalent hydrocarbon radical having from about 4 to 30 carbon atoms or a radical selected from the group represented by the formulas:

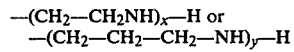

in which x and y are integers from 1 to 6 and R' is hydrogen or a monovalent hydrocarbon radical having from 1 to 8 carbon atoms.

Fuel and lubricant compositions comprising a mixture of hydrocarbons boiling in the motor fuel and the lubricating oil boiling ranges containing a minor effective detergent and/or rust inhibiting amount of the novel reaction product of the invention are also provided.

SPECIFIC EMBODIMENTS OF THE INVENTION

The glycol polyether reactant employed for preparing the novel reaction product of the invention is represented by the formula:

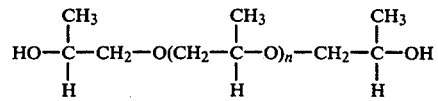

in which n represents a number from about 10 to 90 and preferably from about 13 to 80. In general, n has a value to provide a glycol polyether having a molecular weight ranging from about 700 to 5500, preferably from about 900 to 4500, and most preferably a molecular weight range from about 1100 to 2500.

The second component employed in the preparation of an intermediate reaction product is an acrylic acid represented by the formula:

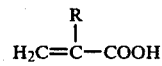

in which R represent hydrogen or a methyl radical. Acrylic acid is the preferred reactant but methacrylic acid is also effective.

The acrylic acid component reacts with the glycol polyether to form an acrylic ester of the glycol polyether. This reaction may be represented by the following formulas:

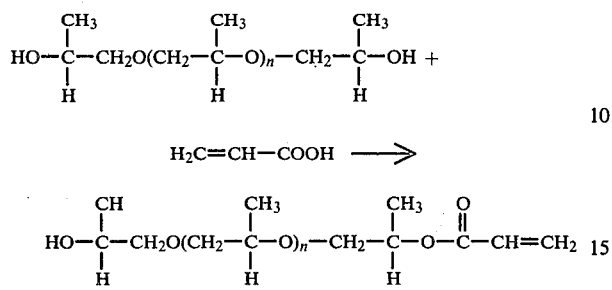

From about 0.5 to 2 moles of the acrylic moiety can be reacted with the glycol polyether to form the intermediate reaction product. It is preferred, however, to employ from about 1 to 2 moles of the acrylic acid per mole of the glycol polyether.

This reaction is conducted by admixing the reactants and maintaining them at a temperature ranging from about room temperature up to a temperature below the decomposition temperature of the reactants and the reaction product.

It is preferred to dissolve the reactants in an inert hydrocarbon and to employ a catalyst to speed-up the reaction. Para-toluene sulfonic acid is particularly effective for promoting the noted reaction. A small amount of an oxidation inhibitor, such as hydroquinone, is also useful for reducing the formation of undesirable by-products. It is preferred to effect the reaction at the reflux temperature of the solvent employed which, in the case of the solvent xylene is about 140° C. On completion of the preparation of the intermediate reaction product, the reaction mixture is cooled and the solvent is removed under reduced pressure.

The intermediate reaction product is reacted with an amine to form the novel additive of the invention. The amine reactant is represented by the formula:

RNHR' in which R is a monovalent hydrocarbon radical having from about 4 to 30 carbon atoms or a radical selected from the group represented by the formulas:

—(CH$_2$—CH$_2$NH)$_x$—H or
—(CH$_2$—CH$_2$—CH$_2$—NH)$_y$—H in which x and y are integers from 1 to 6 and R' is hydrogen or a monovalent hydrocarbon radical having from 1 to 8 carbon atoms.

Examples of suitable amines include butylamine, hexylamine, 2-ethylhexylamine decylamine tetradecylamine, octadecylamine, N-ethyl-N-decylamine, N-ethyl-N-dodecylamine, dibutylamine, diamylamine, dihexylamine, di-(2-ethylhexyl)amine, N-ethyl-N-2-ethylhexylamine. The preferred primary amines are those in which the hydrocarbon radical has from 6 to 18 carbon atoms.

Suitable polyamine include ethylenediamine, 1,3-propanediamine, diethylenetriamine, triethylenetetramine, tetraethylenepentamine, pentaethylene-hexamine, N-oleyl-1,3-propylene diamine, N-lauryl-1,3-propylene diamine, N-tallow-1,3-propylene diamine, N-stearyl-1,3-propylene diamine, N-tallow-1,3-ethylene diamine and N-soya-1,2-ethylene diamine.

In the second step of the process for preparing the novel reaction product, the intermediate reaction product described above is reacted with the prescribed amine. This reaction can be depicted by the following formulas;

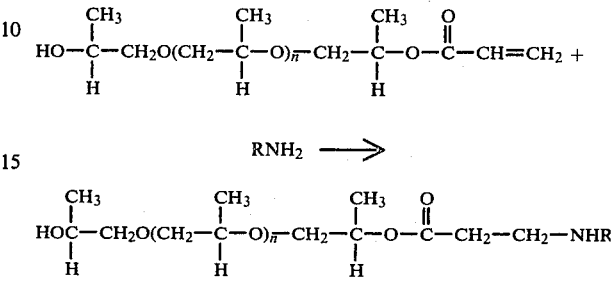

The above formulas illustrate the reaction of an acrylate ester with an amine on a 1:1 mole basis. Intermediate reaction products can be prepared having up to about 2 ester groups, i.e., acrylate ester groups. The amine component can be reacted with the intermediate reaction products on an amine to acrylate ester group ratio of 1:1. Thus, the preferred general mole ratios for combining the glycol polyether, acrylic acid and amine can be expressed as in the range of about 1:1–2:1–2 respectively with the acrylate ester group and the amine being present in approximately equimolar amounts. The most preferred mole ratios for the components is about 1:1:1 respectively.

The following Examples illustrate the preparation of the intermediate reaction product from the reaction of a glycol polyether and an acrylic acid.

EXAMPLE I 1000.0 grams of the polyether of glycol represented by the formula:

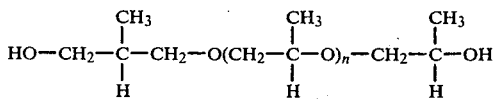

n = 13–15 having a molecular weight of about 1200 was dissolved in 100 milliliters of xylene. 60 grams of acrylic acid, 10.0 grams of paratoluene sulfonic acid and 2.0 grams of hydroquinone were added to the xylene solution of the reactant. This mixture was heated for about 4 hours at a reflux temperature of about 140° C. The reaction mixture was cooled and the solvent removed under reduced pressure to yield 1050 grams of product having the following analysis:

| Saponification No. D-94 | 42.2 |
|---|---|
| Neutralization No. D-974 | 3.8 |
| Hydroxyl No. | 57 |

EXAMPLE II 1000 grams of the glycol polyether of Example I were reacted with 60 grams of acrylic acid according to the method described in Example I. 1053 grams of product were recovered having the following analysis:

| Saponification No. | 38.8 |
|---|---|
| Neutralization No. | 4.7 |
| Hydroxyl No. | 57.0 |

EXAMPLE III 2000.0 grams of the glycol polyether of Example I was reacted with 120.0 grams of acrylic acid according to the method of Example I. 2125 grams of product was recovered having the following analysis:

| Saponification No. | 44.1 |
|---|---|
| Neutralization No. | 3.23 |
| Hydroxyl No. | 54 |

EXAMPLE IV 2000 grams of the glycol polyether of Example I and 120 grams of acrylic acid were reacted following the procedure of Example I to yield 2122 grams of product having the following analysis:

| Saponification No. | 44.4 |
|---|---|
| Neutralization No. | 4.1 |
| Hydroxyl No. | 58 |

EXAMPLE V 200 grams of a glycol polyether represented by the formula:

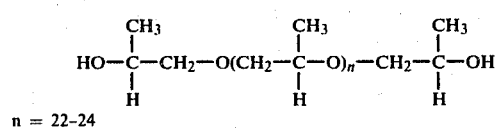

n = 22-24 having a molecular weight of about 2000, was dissolved in 100 milliliters of xylene. 7.5 grams of acrylic acid, 2.0 grams of paratoluene sulfonic acid and 0.5 grams of hydroquinone were added to the xylene solution. This mixture was heated at a reflux temperature of about 140° C. for 4 hours. The mixture was then cooled and the solvent removed under reduced pressure to yield 207 grams of product having the following analysis:

| Saponification No. | 26.7 |
|---|---|
| Neutralization No. | 3.66 |
| Hydroxyl No. | 36 |

EXAMPLE VI 1000 grams of the glycol polyether of Example V were reacted with 40.0 grams of acrylic acid following the procedure of Example V. 1041 grams of product were recovered having the following analysis:

| Saponification No. | 23 |
|---|---|
| Neutralization No. | 4.72 |
| Hydroxyl No. | 34 |

EXAMPLE VII 1000 grams of glycol polyether having a molecular weight of about 4000 was dissolved in 100 milliliters of xylene. 20 grams of acrylic acid, 15 grams of toluene sulfonic acid and 2.5 grams of hydroquinone were added to the xylene solution. This mixture was heated at 140° C. for about 4 hours and then allowed to cool. The solvent was removed under reduced pressure to give 1020 grams of product having the following analysis:

| Saponification No. | 16.4 |
|---|---|
| Neutralization No. | 2.0 |
| Hydroxyl No. | 34 |

The following examples illustrate the reaction of the glycol polyether-acrylate ester intermediate reaction product with an amine to form the novel reaction product of the invention.

EXAMPLE VIII 636 grams of the intermediate ester prepared in Example III above, was dissolved in 500 milliliters of xylene. 135 grams of tallowamine (ARMEEN T) was added to the mixture and the mixture heated to about 120° C. and held at this temperature for 1 hour. The reaction mixture was filtered and the solvent removed to yield 757 grams of product having the following analysis:

| Saponification No. | 28.2 |
|---|---|
| Neutralization No. | 3.08 |
| Nitrogen, % | 1.08 |
| Total Base No. | 32.5 |

EXAMPLE IX 127.0 grams of the glycol polyether-acrylate ester from Example I above was reacted with 27.0 grams of tallowamine following the procedure of Example VIII above. 147.4 grams of product were recovered having the following analysis:

| Saponification No. | 28.5 |
|---|---|
| Neutralization No. | 2.06 |
| Nitrogen, % | 0.90 |
| Total Base No. | 33.9 |

EXAMPLE X 127.0 grams of the glycol polyether-acrylate ester from Example I above, were reacted with 6.0 grams of 2-ethylenediamine following the procedure of Example VIII above. 128.1 grams of product were recovered having the following analysis:

| Saponification No. | 25.3 |
|---|---|
| Neutralization No. | 2.03 |
| Nitrogen, % | 1.41 |
| Total Base No. | 46. |

EXAMPLE XI 381.0 grams of mixture of the glycol polyether acrylate ester from Examples I and II above was reacted with 60.0 grams of tallowamine following the procedure of Example VIII above. 434.0 grams of product were recovered having the following analysis:

| | |
|---|---|
| Saponification No. | 31.5 |
| Neutralization No. | 3.0 |
| Nitrogen, % | 0.66 |
| Total Base No. | 31.6 |

EXAMPLE XII 127 grams of the glycol polyether-acrylate ester from Example II above, were reacted with 32.0 grams of primary amino secondary $C_{15}$ alkane (Armeen L-15) following the procedure of Example VIII above. 158.5 grams of product were recovered having the following analysis:

| | |
|---|---|
| Saponification No. | 24.5 |
| Neutralization No. | 3.84 |
| Nitrogen, % | 0.88 |
| Total Base No. | 30.6 |

EXAMPLE XIII 150 grams of the glycol polyether-acrylate ester from Example V above was reacted with 20.0 grams of tallowamine following the procedure of Example VIII above. 169 grams of product were recovered having the following analysis:

| | |
|---|---|
| Saponification No. | 23.3 |
| Neutralization No. | 4.47 |
| Nitrogen, % | 0.66 |
| Total Base No. | 21.7 |

EXAMPLE XIV 300 grams of the glycol polyether-acrylate ester from Example VI above, were reacted with 40.0 grams of tallowamine following the procedure of Example VIII above. 339 grams of product were recovered having the following analysis:

| | |
|---|---|
| Saponification No. | 20.4 |
| Neutralization No. | 3.94 |
| Nitrogen, % | 0.65 |
| Total Base No. | 32.2 |

The reaction product of the invention is useful as a detergent and/or a corrosion inhibitor for hydrocarbon fuels, mineral oils and lubricating oil compositions. In general, the reaction product of the invention is effective as a carburetor detergent and/or inhibitor in a motor fuel composition comprising a mixture of hydrocarbons in the gasoline boiling range, i.e., from about 90° to 425° F. Broadly effective concentrations as detergent and corrosion inhibitors in fuels range from about 0.0005 to 0.20 weight percent of the reaction product based on the weight of the gasoline composition. A preferred concentration of the reaction product in gasoline is an amount ranging from about 0.002 to 0.01 weight percent which corresponds to about 5 and 25 PTB (pounds of additive per 1000 barrels of gasoline), respectively.

In oil compositions the reaction product can be employed at concentrations ranging from about 0.0005 to 10 weight percent with a preferred concentration being from 0.01 to 5 weight percent based on the total weight of the oil composition. Concentrates of the additives in oil or motor fuels can be prepared containing from 0.0005 to 50 weight percent of the additive.

The effectiveness of the reaction product of the invention as a carburetor detergent was tested in the Chevrolet Carburetor Detergency Test designed to remove preformed deposits from the throttle plate area of a carburetor. This test is run using a Chevrolet V-8 engine mounted on a test stand and fitted with a modified four-barrel carburetor. The two secondary barrels of the carburetor are sealed and the feed to each of the primary barrels arranged so that the detergent additive fuel can run in one barrel and the reference fuel can run in the other. The primary carburetor barrels are also modified to contain removable aluminum inserts in the throttle plate area so that the deposits adhering to the inserts may be conveniently weighed.

The engine is run for a period of time, usually 24 or 48 hours, using base fuel as the feed to both carburetor barrels with engine blow-by circulated to the carburetor air inlet. The weight of the deposits thus formed is measured and recorded. The inserts are returned to the carburetor and the engine is run on a test cycle for 24 hours with base fuel containing a recognized commercial detergent being fed to one barrel and base fuel containing the test additive being fed to the other. Again, engine blow-by is circulated to the carburetor air inlet during the test cycle. Upon completion of the test cycle, the inserts are removed from the carburetor and weighed to determine the difference between the performance of the test additive and the commercial detergent fuels. After the aluminum inserts have been cleaned and replaced in the carburetor the process is repeated with the fuel feeds to the carburetor in the test cycle reversed to minimize any difference in fuel distribution or carburetor construction. The results obtained in the two runs are averaged and the effectiveness of the additive fuel in removing deposits is expressed in percent.

The base fuel employed in this and in the subsequent tests was a premium grade gasoline having a Research Octane Number of about 97 and contained about 3.0 cc of tetraethyl lead per gallon. This gasoline consisted of about 30.5% aromatic hydrocarbons, 8.5% olefinic hydrocarbons and 61.% paraffinic hydrocarbons and boiled in the range from about 89° F. to 356° F.

The results obtained in the Chevrolet Carburetor Detergency Test using the above-described base fuel and the indicated additives are set forth in Table I below.

TABLE I

| CHEVROLET CARBURETOR DETERGENCY TEST | | |
|---|---|---|
| Run | Additive Conc. | Effectiveness |
| 1. | Base Fuel + 100 PTB of 1200 M.W. glycol polyether | −26 |
| 2. | Base Fuel + 100 PTB of Example IX | +23 |
| 3. | Base Fuel + 150 PTB of Example XIV | +27 |

Run 1 consisting of the base fuel and a 1200 molecular weight glycol polyether possesses significant carburetor detergent properties. A non-additive fuel would be expected to be about 40 percent less effective than the reference fuel of Run 1. In contrast, Runs 2 and 3 demonstrated a substantial improvement in the carburetor detergency of a motor fuel containing the reaction products of the invention.

Colonial Pipeline Rust Test

A steel spindle, 3 3/16 inches long and ½ inch wide made from ASTM D-665-60 steel is used in the Colonial Pipeline Rust Test. The spindle is placed in a 400-cc beaker with 300 cc of fuel sample which is maintained at 100° F. from 1½ hour. Then, 30 cc of distilled water are added. The beaker and contents are kept at 100° F. for 3½ hours. Spindle is thereafter visually inspected and the percentage of rusted surface area is estimated. A rust result of 5% or less is a passing value.

The results of this test are given in Table II below:

TABLE II

| | Colonial Pipeline Rust Test | | |
|---|---|---|---|
| Additive | Concentration PTB | | % Rust |
| 1. | Base Fuel None | | 50–100 |
| 2. | Base Fuel + 100 PTB of Example XI | | 1–5 |
| 3. | Base Fuel + 100 PTB of Example XIII | | 1–5 |
| 4. | Base Fuel + 100 PTB of Example XIII | | 5–10 |
| 5. | Base Fuel + 50 PTB of Example XIII | | 5–10 |

The above tests demonstrate that the reaction product of the invention is effective as a rust and corrosion inhibitor in the Colonial Pipeline Rust Test. The novel reaction product and the oil compositions containing same provide a substantial improvement in the carburetor detergency and corrosion inhibitor of mineral oil compositions and also provides new ways for preparing these valuable products.

We claim:

1. A motor fuel composition comprising a mixture of hydrocarbons in the gasoline boiling range and a glycol polyether reaction product represented by the formula:

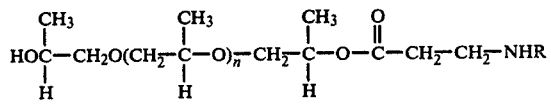

in which n is a number from about 10 to 90 and R is a monovalent hydrocarbon radical having from about 2 to 30 carbon atoms or a radical selected from the group represented by the formulas:

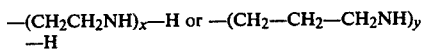

in which x and y are integers from 1 to 6.

2. A motor fuel composition according to claim 1 in which n has a value from 13 to 80.

3. A motor fuel composition according to claim 1 in which R has from 6 to 18 carbon atoms.

4. A motor fuel composition according to claim 1 in which R is a hydrocarbyl radical derived from tallow.

5. A motor fuel composition according to claim 1 in which R is a butyl radical.

6. A motor fuel composition according to claim 1 containing from about 0.0005 to 0.20 weight percent of said glycol polyether reaction product.